April 2, 1929.  W. D. HARRIS ET AL  1,707,672
CONTACT AND FILTER APPARATUS
Filed Feb. 13, 1928

INVENTORS:
W. D. Harris & R. V. Aycock
BY
Thorpe & Thorpe ATTORNEYS.

Patented Apr. 2, 1929.

1,707,672

UNITED STATES PATENT OFFICE.

WILLIAM D. HARRIS AND ROBERT V. AYCOCK, OF KANSAS CITY, MISSOURI, ASSIGNORS TO REFINOIL MANUFACTURING CORPORATION, OF KANSAS CITY, MISSOURI, A CORPORATION OF MISSOURI.

CONTACT AND FILTER APPARATUS.

Application filed February 13, 1928. Serial No. 253,951.

Our invention relates to apparatus for filtering lubricating oils and was designed more particularly for use in connection with our improved process for refining used mineral lubricating oils which is fully described and claimed in our co-pending application Serial No. 295,835 in which the last steps of the process consist in causing the oil, after it leaves the still in which the diluents are vaporized, to pass upwardly through an active adsorptive reagent then allowing the products of the reaction to settle into a bed which forms a very satisfactory filter.

Our invention has for its object to produce an apparatus in which to carry out the steps as above outlined and further to produce a device which will retain the heat in the oil while it is being purified.

With the general object named in view, the invention consists in certain novel and useful features of construction and organization as hereinafter described and claimed; and in order that it may be fully understood, reference is to be had to the accompanying drawing, in which:

Figure 1:
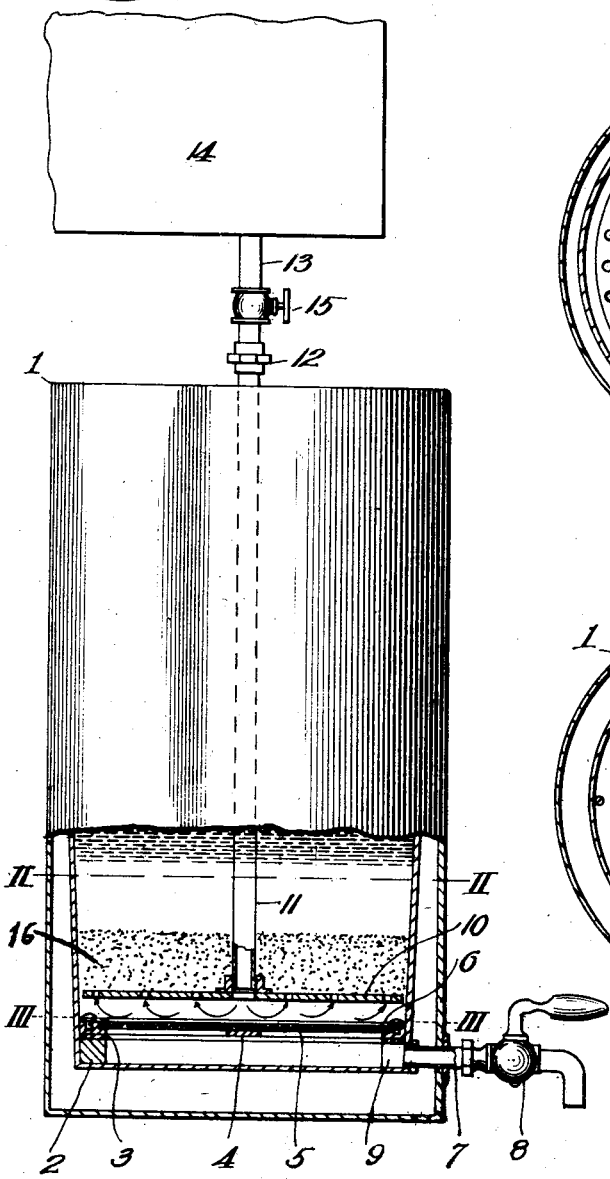
Figure 1 is a central vertical section taken through a combined contact and filter chamber forming a part of the invention.
Figure 2:
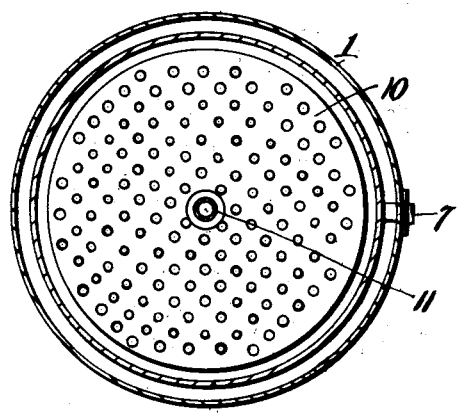
Figure 2 is a section on the line II—II of Figure 1.
Figure 3:
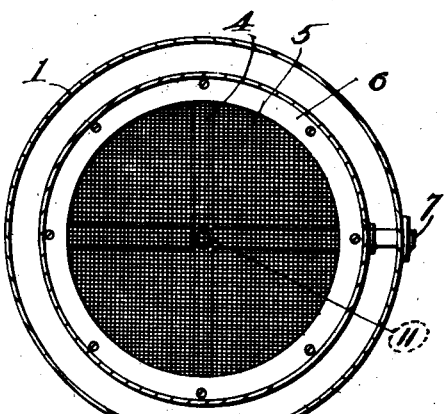
Figure 3 is a section on the line III—III of Figure 1.

In the said drawing, where like reference characters identify corresponding parts in all of the figures, 1 indicates a double-walled contact chamber and filter, the double walls being provided to assist in retaining the heat of the oil as discharged from a still, although of course such a construction is not a prerequisite for the operation of the process as will hereinafter appear and other means of insulation may be employed. Fitted within the bottom of the contact chamber is a ring 2 providing a shoulder receiving a sealing gasket 3 for the support of a ring spider 4 carrying a fine mesh screen or filter 5 held in clamped position on the spider by an overlying clamping plate 6. Communicating with the contact chamber below the screen 5 is an outflow pipe 7 controlled by a valve 8, the bottom ring 2 being recessed as at 9 to permit uninterrupted communication between the pipe and the chamber.

The particular contact apparatus illustrated comprises a perforated contact plate 10 which is supported some distance above the screen 5 by an oil supply pipe 11 detachably secured by a union 12 to an oil discharge pipe 13 communicating with an oil refining still 14 and being controlled by a hand valve 15. The contact apparatus illustrated and described is the same as shown in copending application Serial No. 228,278, but it is to be understood that any contact apparatus may be utilized which effectuates the production of a porous coagulant or sludge to establish the filter bed as below described.

In the use of the apparatus as illustrated, after the oil has been refined within the still 14, the operator places a sufficient quantity of fuller's earth or equivalent material 16, to which may have been added any desirable reagent to absolutely insure neutralization of the acid in the oil, upon the contact plate 10 which is spaced above the bottom of the tank as shown in the drawing. The valve 15 is now opened and the hot oil is discharged through pipe 11 below the perforated contact plate 10 and passes upwardly through the clarifying material 16. Upon the passage of the oil through the reagent a heavy coagulant or sludge is produced by the reaction between the contamination in the oil and the active ingredients of the fuller's earth, and this sludge which of course also includes any inactive ingredients in the fuller's earth immediately commences to settle, said material passing through the openings in the contact plate 10 and rests on and is supported by the screen 5. When it is desired to filter the oil, the valve 8 is opened and five or six gallons of the oil are withdrawn and poured back into the top of the tank to insure that no oil shall have been untreated by being pocketed below the screen. After a quantity of the oil has been withdrawn and replaced in the apparatus, the valve 8 may be fully opened and the oil will slowly percolate through the filter bed provided by the coagulant. It has been found that this coagulated material acquires oil saturated granulated consistency and that the oil discharged therethrough is entirely free of sediment. The advantages in the saving of time and expense of special filter equipment, of this process by entirely omitting the step of decanting or separately filtering the treated oil, are obvious. In other words, it has been found that the character of the fuller's earth is altered by contact and that if this material is permitted to settle and the entire body of oil passed therethrough, the oil is clarified better than if it were permitted to pass through in one direction only. That is, if it is passed through the fuller's earth in one direction only, the advantage of the changed character of the material by the contacting step is lost.

From the above description, it will be apparent that while we have described and claimed the preferred embodiment of the invention, we reserve the right to make all changes properly falling within the spirit and scope of the appended claims.

We claim:

1. In a device of the character described, a still, a heat insulated contact and filter chamber, a perforated plate in said chamber in contact with the outer wall thereof, a down-flow pipe which leads from said still and supports said plate in spaced relation to the bottom of said chamber, a filter screen mounted in said insulated chamber intermediate the said plate and the bottom of the chamber, and means to draw off the purified oil from said space.

2. In a device of the character described, a still, a contact and filter chamber, a perforated plate in said chamber in contact with the outer wall thereof, a down-flow pipe which leads from said still and supports said plate in spaced relation to the bottom of said chamber, a filter screen mounted intermediate the said plate and the bottom of the chamber, and means to draw off the purified oil from said space.

3. In a device of the character described the combination with a still, of a contact chamber, a perforated plate adjacent the bottom thereof but spaced therefrom, means to lead oil from said still to the lower side of said perforated plate, a filter screen mounted intermediate said plate and the bottom of said chamber in contact with the outer wall thereof but spaced from the plate and the bottom and below the outlet of said pipe, and means to draw off the purified oil from below said screen.

4. In a device of the character described, the combination with a still, of a contact and filter chamber, means to insulate the walls of said chamber, a perforated plate in said chamber adjacent its bottom but spaced therefrom, means to connect said still to the bottom of said plate, a filter screen intermediate said plate and said bottom but spaced from both, said screen being below the outlet of said means, a ring spider to support said screen, an annular member, a gasket on said member, a ring which clamps said screen and gasket to said annular member, and means to draw off the purified oil from below said screen.

5. In a device of the character described, the combination with a source of supply of oil to be purified, of a contact and filter chamber, a perforated plate spaced from the bottom of said chamber in contact with the outer wall thereof, a filter screen intermediate the plate and the bottom of the chamber but spaced from them both, a pipe to convey oil to the chamber below said plate and above said screen, and means to draw off the purified oil from below said screen.

In testimony whereof we affix our signatures.

WILLIAM D. HARRIS.
ROBERT V. AYCOCK.